US012603844B2

(12) United States Patent
Basu et al.

(10) Patent No.: US 12,603,844 B2
(45) Date of Patent: Apr. 14, 2026

(54) DEADLOCK FREE ALL-TO-ALL COLLECTIVE COMMUNICATION SCHEDULES

(71) Applicant: RTX BBN Technologies, Inc., Cambridge, MA (US)

(72) Inventors: Prithwish Basu, Westford, MA (US); Joud Khoury, Boston, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 77 days.

(21) Appl. No.: 18/405,630

(22) Filed: Jan. 5, 2024

(65) Prior Publication Data

US 2025/0227067 A1 Jul. 10, 2025

(51) Int. Cl.
H04L 47/125 (2022.01)
H04L 47/17 (2022.01)

(52) U.S. Cl.
CPC ............ H04L 47/125 (2013.01); H04L 47/17 (2013.01)

(58) Field of Classification Search
CPC .............................. H04L 47/125; H04L 47/17
See application file for complete search history.

(56) References Cited

U.S. PATENT DOCUMENTS

2004/0076122 A1 * 4/2004 Wittorff .................. H04L 45/02
                                                                370/254
2014/0068132 A1 * 3/2014 Philip .............. G06F 15/17312
                                                                710/306

FOREIGN PATENT DOCUMENTS

KR          20130167789          *  7/2015

OTHER PUBLICATIONS

Y. Wang and Y. Li, "Load-Balancing Routing Algorithms for Reducing Packet Latency and Avoiding Deadlock in Datacenter Interconnection Networks," 2022 Tenth International Symposium on Computing and Networking Workshops (CANDARW), Himeji, Japan, 2022, pp. 261-267, doi: 10.1109/CANDARW57323.2022. 00011. (Year: 2022).*
Y. Chen and J. Wu, "Max progressive network update," 2017 IEEE International Conference on Communications (ICC), Paris, France, 2017, pp. 1-6, doi: 10.1109/ICC.2017.7997201. (Year: 2017).*
"Google AI Supercomputer Shows the Potential of Optical Interconnects", pp. 1-8, retrieved Nov. 12, 2024, retrieved from https://www.hpcwire.com/2023/04/10/google-ai-supercomputer-shows-the-potential-of-optical-interconnects/.
Jouppi et al., "TPU v4: An Optically Reconfigurable Supercomputer for Machine Learning with Hardware Support for Embeddings", ISCA '23, Jun. 17-21, 2023, pp. 1-14.
Pal et al., "Efficient All-to-All Collective Communication Schedules for Direct-Connect Topologies", eprint arXiv:2309.13541, Sep. 2023, pp. 1-17.
Zhao et al., "Efficient Direct-Connect Topologies for Collective Communications". arXiv:2202.03356v4, Sep. 2023, pp. 1-32.

* cited by examiner

*Primary Examiner* — Messeret F Gebre
(74) *Attorney, Agent, or Firm* — CANTOR COLBURN LLP

(57) ABSTRACT

This disclosure relates to determining a first bandwidth of one or more first links for one or more nodes in the network; determining a second bandwidth of one or more second links for the one or more nodes; determining that a demand constraint has been met on the network; and determining that a conservation constraint has been met on the network.

20 Claims, 6 Drawing Sheets

101a                                101b 101a                    101b

100

202          204                    206

208          210

212

200

202     204     206

208     210     212

250

302

Determine Max
Concurrent Flow
Rates

304

Constraints Met?

306

Determine Directed
Graph

308

Cycle Free?

310

Deploy Virtual Links

300

DEADLOCK FREE ALL-TO-ALL COLLECTIVE COMMUNICATION SCHEDULES

STATEMENT REGARDING FEDERALLY SPONSORED RESEARCH OR DEVELOPMENT

This application was made with government support under Contract No. HR001120C0089, owned by the Department of Defense. The U.S. Government may have certain rights in this invention.

BACKGROUND

1. Field of the Disclosure

At least one example in accordance with the present disclosure relates generally to scheduling and routing of data in direct connect topologies.

2. Discussion of Related Art

In machine learning, high end computation, and other computationally intensive applications, direct connect topologies may facilitate simultaneous transmission of data in a timely manner between nodes in the computational network, thereby allowing for efficient use of nodes in the computational network.

SUMMARY

According to at least one aspect of the present disclosure, a method of preventing deadlock in a network is presented, the method comprising: determining a first bandwidth of one or more first links for one or more nodes in the network; determining a second bandwidth of one or more second links for the one or more nodes; determining that a demand constraint has been met on the network; and determining that a conservation constraint has been met on the network. In some examples, determining that the conservation constraint has been met includes: restricting a maximum circulation flow along one or more edges of a channel dependency graph of the network such that the maximum circulation flow is zero; determining that the maximum circulation flow is zero; and determining that the conservation constraint has been met responsive to determining that the maximum circulation flow is zero. In some examples, determining that the demand constraint has been met includes: restricting a demand on a connection between a first node and a second node such that one or more flows on the connection are less than or equal to the demand; determining that the one or more flows on the connection are less than or equal to the demand; and determining that the demand constraint has been met responsive to determining that the one or more flows on the connection are less than or equal to the demand. In some examples, the demand is a proportion of the one or more flows to total flows on the network. In some examples, the method further comprises determining that a link constraint has been met on the network. In some examples, determining that the link constraint has been met includes: determining a capacity of a given link between a first node and a second node; restricting flows on the link such that a total amount of the flows does not exceed the capacity; determining that the flows do not exceed the capacity; and responsive to determining that the flows do not exceed the capacity, determining that the link constraint has been met. In some examples, the capacity is a bandwidth of the link. In some examples, the method further comprises applying at least one of the demand constraint and the conservation constraint to one or more connections between one or more nodes on the network to limit at least one maximum concurrent flow rate on the network. In some examples, the method further comprises partitioning one or more nodes of the network into a first partition; partitioning one or more nodes of the network into a second partition; determining, at a first timestep, that the demand constraint or the conservation constraint is met with respect to the first partition; and determining, at a second timestep, that the demand constraint or the conservation constraint is met with respect to the second partition, the first timestep being different from the second timestep. In some examples, the method further comprises determining that one or more fictitious flows along a channel dependency graph of the network are equal to zero.

According to aspects and elements of the present disclosure, a non-transitory computer readable medium containing thereon computer-executable instructions for instructing at least one processor to prevent deadlock on a network is presented, the instructions instructing the at least one processor to: determine a first bandwidth of one or more first links for one or more nodes in the network; determine a second bandwidth of one or more second links for the one or more nodes; determine whether a demand constraint has been met on the network; and determine whether a conservation constraint has been met on the network. In some examples, the instructions further instruct the at least one processor to: restrict a maximum circulation flow along one or more edges of a channel dependency graph of the network such that the maximum circulation flow is zero; determine that the maximum circulation flow is zero; and determine that the conservation constraint has been met responsive to determining that the maximum circulation flow is zero. In some examples, the instructions further instruct the at least one processor to: restrict a demand on a connection between a first node and a second node such that one or more flows on the connection are less than or equal to the demand; determine whether the one or more flows on the connection are less than or equal to the demand; and determine whether the demand constraint has been met responsive to determining that the one or more flows on the connection are less than or equal to the demand. In some examples, the instructions further instruct the at least one processor to: determining whether a link constraint has been met on the network. In some examples, the instructions further instruct the at least one processor to: determine a capacity of a given link between a first node and a second node; restrict flows on the link such that a total amount of the flows does not exceed the capacity; determine whether the flows do not exceed the capacity; and responsive to determining that the flows do not exceed the capacity, determine whether the link constraint has been met. In some examples, the instructions further instruct the at least one processor to: partition one or more nodes of the network into a first partition; partition one or more nodes of the network into a second partition; determine, at a first timestep, whether the demand constraint or the conservation constraint is met with respect to the first partition; and determine, at a second timestep, whether the demand constraint or the conservation constraint is met with respect to the second partition, the first timestep being different from the second timestep.

According to at least one aspect of the present disclosure, a system for preventing deadlocks on a network is provided, the system comprising: a first cluster including one or more nodes having one or more intracluster connections; a second cluster having at least one intercluster connection to the first cluster, the second cluster including one or more nodes having one or more intracluster connections; a controller coupled to the network and configured to control the network by: determining a first bandwidth of one or more first links for one or more nodes in the network; determining a second bandwidth of one or more second links for the one or more nodes; determining that a demand constraint has been met on the network; and determining that a conservation constraint has been met on the network.

In some examples, the controller is further configured to control the network by: restricting a maximum circulation flow along one or more edges of a channel dependency graph of the network such that the maximum circulation flow is zero; determining that the maximum circulation flow is zero; and determining that the conservation constraint has been met responsive to determining that the maximum circulation flow is zero. In some examples, the controller is further configured to control the network by: restricting a demand on a connection between a first node and a second node such that one or more flows on the connection are less than or equal to the demand; determining that the one or more flows on the connection are less than or equal to the demand; and determining that the demand constraint has been met responsive to determining that the one or more flows on the connection are less than or equal to the demand. In some examples, the controller is further configured to control the network by: determining a capacity of a given link between a first node and a second node; restricting flows on the link such that a total amount of the flows does not exceed the capacity; determining that the flows do not exceed the capacity; and responsive to determining that the flows do not exceed the capacity, determining that a link constraint has been met.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

In high performance computation (HPC) and machine learning (ML) applications, direct-connect computational networks may be comprised of nodes connected according to a topology (the topology being the network of connections interconnecting nodes within the network). The nodes may be clustered, in some examples. Clustered nodes, for example, may be linked together by a common link that has a different bandwidth than the links between nodes outside the cluster and nodes within the cluster.

One operation used in HPC and ML applications is all-to-all transmission. In an all-to-all transmission, each node in the network transmits data to each other node in the network. However, nodes generally have finite buffers in which to hold data. Deadlocks (when no data transmission can occur between one or more nodes) can occur when a buffer is full and waiting to transmit, and is thus unavailable to receive additional data. Deadlocks can be virtually 100% likely when a routing scheme for a network induces the network's channel dependency graph to include a cycle. A cycle is, in simple terms, a loop where a group of nodes are transmitting to one another. When a cycle exists, each node's buffer may fill with data intended for another node in the cycle, but because each node's buffer is full, no node can transmit data.

Aspect and elements of this disclosure relate to techniques for preventing deadlock from occurring in direct-connect topology networks by creating virtual channels between nodes to eliminate cycles from the network. As a result, the techniques disclosed herein allow for all-to-all transmissions to occur in networks without resulting in deadlock. More generally, the techniques disclosed herein prevent deadlock when executing any collective operations (such as all-to-all, some-to-some, and so forth) on a network. The techniques described herein prevent deadlocks whether every node or a subset of nodes are executing one or more collective operations.

Figure 1:
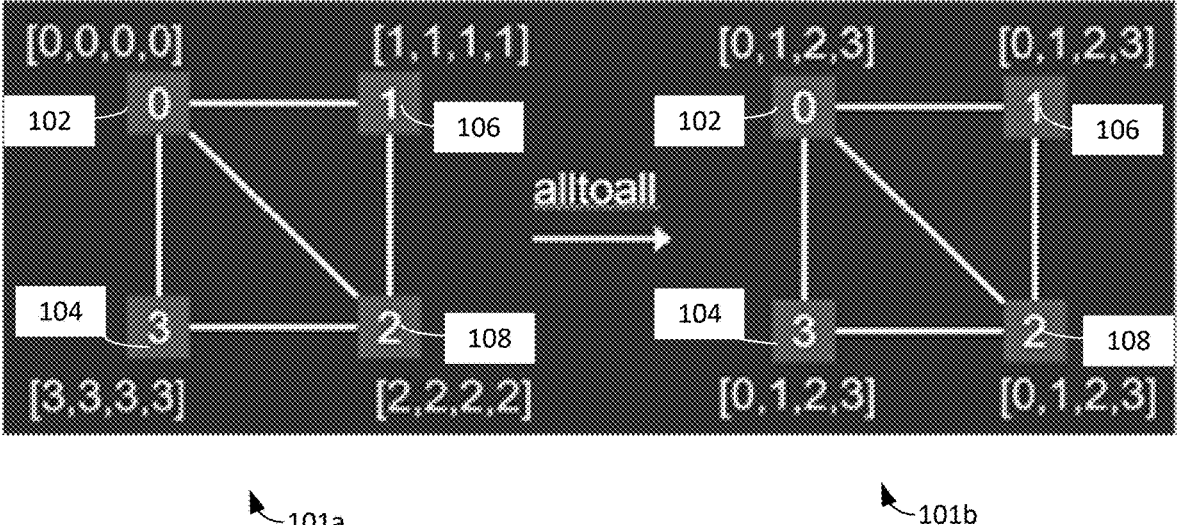
FIG. 1 illustrates a network executing an alltoall collective operation according to an example.

FIG. 1 illustrates a network 100 executing an all-to-all operation according to an example. An all-to-all operation is a collective operation where each node transmits data to each other node. The network 100 includes a first node 102, a second node 104, a third node 106, and a fourth node 108. The network 100 is illustrated in a first state 101a prior to performing the all-to-all operation, and a second state 101b after the all-to-all operation has been performed. The all-to-all operation may be performed over one or more timesteps.

In the first state 101a, the first node 102 contains a vector of data comprising a plurality of 0s, the second node 104 contains a vector of data comprising a plurality of 1s, the third node 106 contains a vector of data comprising a plurality of 2s, and the fourth node 108 contains a vector of data comprising a plurality of 3s. Each node has also been assigned an index, with the first node 102 having an index of 0, the second node 104 having an index of 1, the third node 106 having an index of 2, and the fourth node 108 having an index of 3.

When the all-to-all operation is performed, each node propagates the contents of the data vector corresponding to each other node's index respectively to each other node. For example, the first node 102 transmits the $0^{th}$ element of the data vector to whichever node has an index of 0 (in some examples, the first node 102 may have an index of 0), the first node 102 transmits the $1^{st}$ element of the data vector to the second node 104 (the second node 104 may have an index of 1), the first node 102 transmits the $2^{nd}$ element of the data vector to the third node 106 (the third node 106 may have an index of 2), and the first node 102 transmits the $3^{rd}$ element of the data vector to the fourth node 108 (the fourth node 108 may have an index of 3). The other nodes behave in a similar manner, such that for a given node that node transmits the $n^{th}$ element of its respective data vector to the node having the $n^{th}$ index. In each case, the receiving node stores the received data in the index corresponding to the first node 102 (e.g., index 0 of that respective receiving node's data vector).

The second state 101b illustrates the result of the above described operation. Each node now contains an identical data vector. That is, each of the first node 102, second node 104, third node 106, and fourth node 108 contain a data vector <0, 1, 2, 3>.

Note that the values at a given index of a given node in the first state 101a may be anything, and need not be limited to the example provided. That is, the 0s, 1s, 2s, and 3s of the data vectors may be replaced with any value, vector, object, or other data. As a result, the vectors in each node need not be identical to one another.

Note that in a collective operation, like all-to-all, the amount of data flowing in the network can be quite large. The minimum amount of data flowing is equal, in this example, to the square of the number of nodes in the network. That is, for a network of N nodes there are $N^2$ data flows.

Figure 2A:
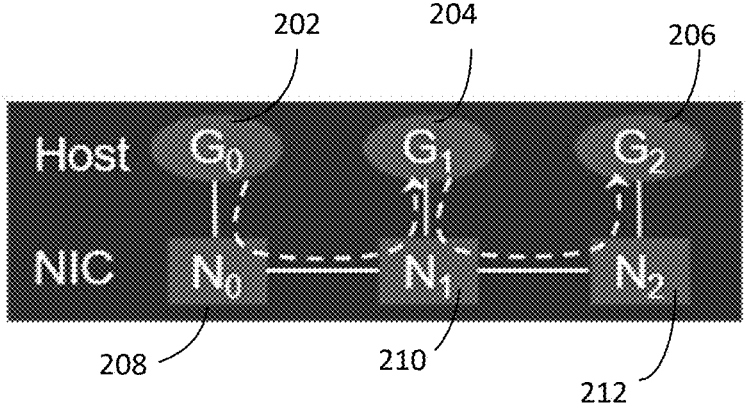
FIG. 2A illustrates a first network topology without wormholing according to an example.

FIG. 2A illustrates a first network topology 200 ("network 200") according to an example. The network 200 includes a first node 202, a second node 204, a third node 206, a first switching device 208 ("first switch 208), a second switching device 210 ("second switch 210"), and a third switching device 212 ("third switch 212"). The switching devices may be any kind of switching device suitable for a direct-connect network, for example, a network interface controller ("NIC").

The first node 202 is coupled to the first switch 208. The second node 204 is coupled to the second switch 210. The third node 206 is coupled to the third switch 212. The second switch 210 is coupled to the first switch 208 and third switch 212.

The network 200 is configured using hop-to-hop routing. That is, the switches 208-212 do not support "wormholing" (e.g., direct forwarding) and thus must route data they receive to the node to which they are coupled before the data can be routed further on. For example, data sent from the first node 202 to the third node 206 must go to through the first switch 208 and second switch 210 to the second node 204 and then from the second node 204 through the second switch 210 and third switch 212 to the third node 206. That is, the second node 204 acts as an intermediary that receives the data (e.g., on the CPU or GPU of the second node 204) prior to the data continuing on to the third node 206.

Figure 2B:
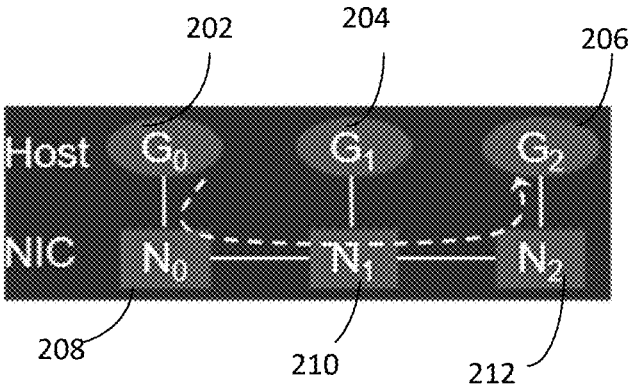
FIG. 2B illustrates a second network topology with wormholing according to an example.

FIG. 2B illustrates a second network topology 250 ("network 250") according to an example. The network 250 is identical to the network 200 except that the switches 208-212 now support or have been configured to support "wormholing"—that is, the network 200 is source-routed. In a wormholing configuration, the intermediary node can begin forwarding a packet before the packet is entirely received.

Forwarding may begin as soon as the intermediary node knows the node to which it is forwarding the packet (which may be predetermined, or may be contained in header bits in the packet, such that the intermediary node need only receive the header bits before it begins forwarding). As a result, data originating with one node can be transmitted to another node without stopping at any intervening nodes. For example, if the first node 202 is transmitting data to the third node 206, the data may be transmitted from the first node 202 through the first switch 208, second switch 210, and third switch 212, and thence to the third node 206 in a continuous or semi-continuous manner.

Because forwarding can begin immediately or almost immediately (e.g., as soon as at least one bit of the packet is received), deadlocks may occur if the next node in line (e.g., another intermediary node or the destination node) does not have sufficient space in its buffer to hold the entire packet.

Figure 3:
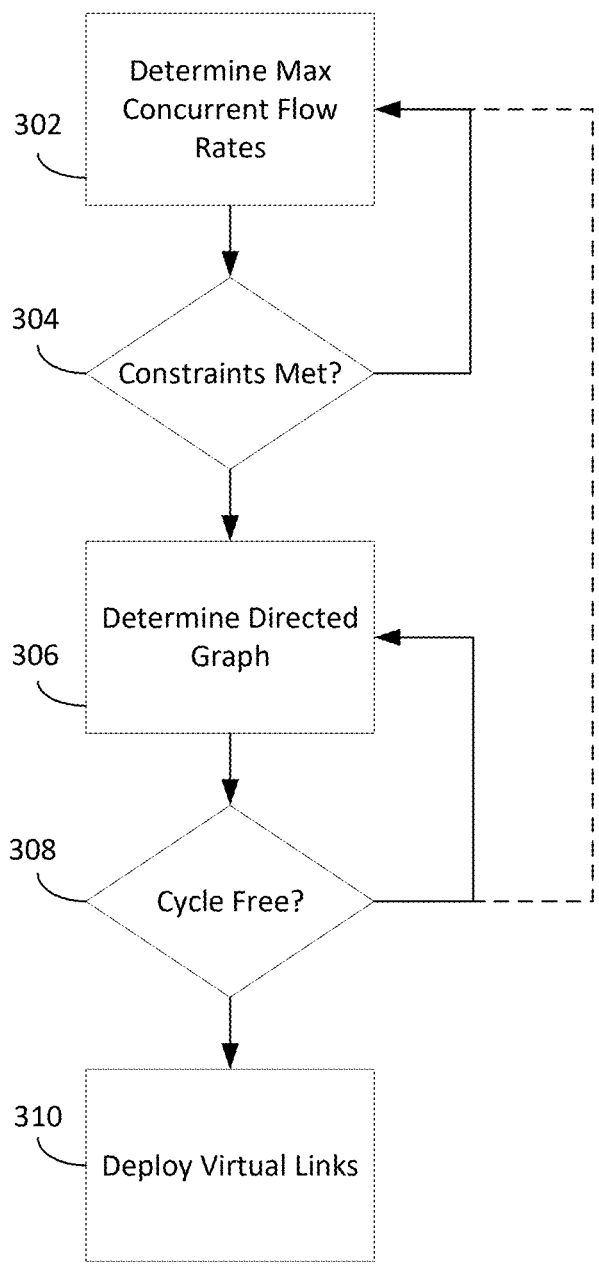
FIG. 3 illustrates a process for ensuring that a collective operation on any topology is deadlock-free and efficient according to an example.

FIG. 3 illustrates a process 300 for ensuring that a collective operation on any topology is deadlock-free and efficient. The process 300 involves determining max concurrent flow rates on the topology, constructing a directed graph (e.g., a set of routes) on the topology based on the max concurrent flow rates, and verifying that the directed graph is cycle free. The directed graph may, in some examples, be the channel dependency graph induced by the set of flows or paths induced by the routing schedule and/or routing algorithm based on flows having non-zero values. If the directed graph is cycle free, virtual links may be deployed onto the topology (e.g., in the form of a schedule or routing plan) so that the cycle-free scheduling and routing may be used during collective operations.

At act 302, at least one controller ("controller") determines the max concurrent flow rates within the topology. The controller may determine the max concurrent flow rates based on the link capacity of a given connection between nodes in the topology. For example, with reference to FIG. 2B, the controller may determine the flow rates between the first node 202 and second node 204, the first node 202 and third node 206, the second node 204 and third node 206, and so forth. The process 300 may then continue to act 304.

At act 304, the controller may determine whether constraints on the maximum concurrent flow rates have been satisfied. The constraints may include demand constraints and/or conservation constraints. Other constraints may also be used.

The demand constraint may be a constraint representing the demand for each connection in the topology. That is, a given connection may be expected to handle more or less of the flows (communications) on the network. The proportion of flows a given connection is expected to handle may therefore reflect the demand. The controller may determine the demand assigned to each connection in the topology. The demand constraint may require that no connection on the network exceed the demand (e.g., the proportion of flows) assigned to that connection.

The conservation constraint may, in some examples, be a requirement that flow conservation laws are observed. In some examples, the conservation constraint may further require that the maximum circulation flow (of a transmission) on the network is exactly zero. In some examples, the conservation constraint may require that the maximum circulation flow along the edges of the channel dependency graph induced by the routing schedule and/or algorithm (e.g., as described above, for non-zero flows) is exactly zero. This constraint may prevent deadlocks as, if the maximum circulation flow is greater than zero, deadlocks will eventually happen when the system is under high load (in the sense of transmitting large amounts of data).

A link capacity constraint may also be imposed, requiring that flows on the network not exceed the capacity (e.g., bandwidth) of a given link (e.g., connection) on the topology. The link capacity constraint may require, for example, that no connection be required to handle more data than it is capable of handling. For example, a connection with a bandwidth of 50 Gbps may have a maximum capacity of 50 Gbps, and thus may be constrained to allow no more than 50 Gbps to flow across the link at any time and/or given timestep.

The process 300 may continue to act 306 if the controller determines the constraints are met, or may return to act 302 if the controller determines the constraints are not met.

At act 306, the controller determines a directed graph of flows on the topology. The directed graph may be a representation of routes a flow can take through the topology. The directed graph may be based on the maximum concurrent flow rates and the other constraints mentioned above. The process 300 may then continue to act 308.

At act 308, the controller determines whether the directed graph is cycle free. The controller may determine whether the directed graph is cycle free by, in some examples, providing fictitious flows to the network along various routes. In some examples, if the directed graph does not contain cycles, then there is no way to send a non-zero quantity of fictitious flows through the network while also obeying conservation and link capacity constraints. Thus, if a non-zero quantity of fictitious flows can be provided to the network, the controller may determine that the directed channel dependency graph is not cycle free. If zero fictitious flows can be provided to the network, then the controller may determine that the directed channel dependency graph is cycle free. If the controller determines that the directed channel dependency graph is cycle free, the process 300 may continue to act 310. If the controller determines that the directed channel dependency graph is not cycle free, the process 300 may return to act 306 and/or 302 to redetermine the max concurrent flow rates and/or directed graph to generate a cycle free graph.

At act 310, the controller may deploy the routing and/or scheduling to the network (e.g., the topology) using virtual links between nodes to ensure that the topology is cycle-free during collective operations. Deploying virtual links may include determining which switches and connections between nodes within the topology are active, what directions those links allow flows to travel, and so forth.

Figure 4:
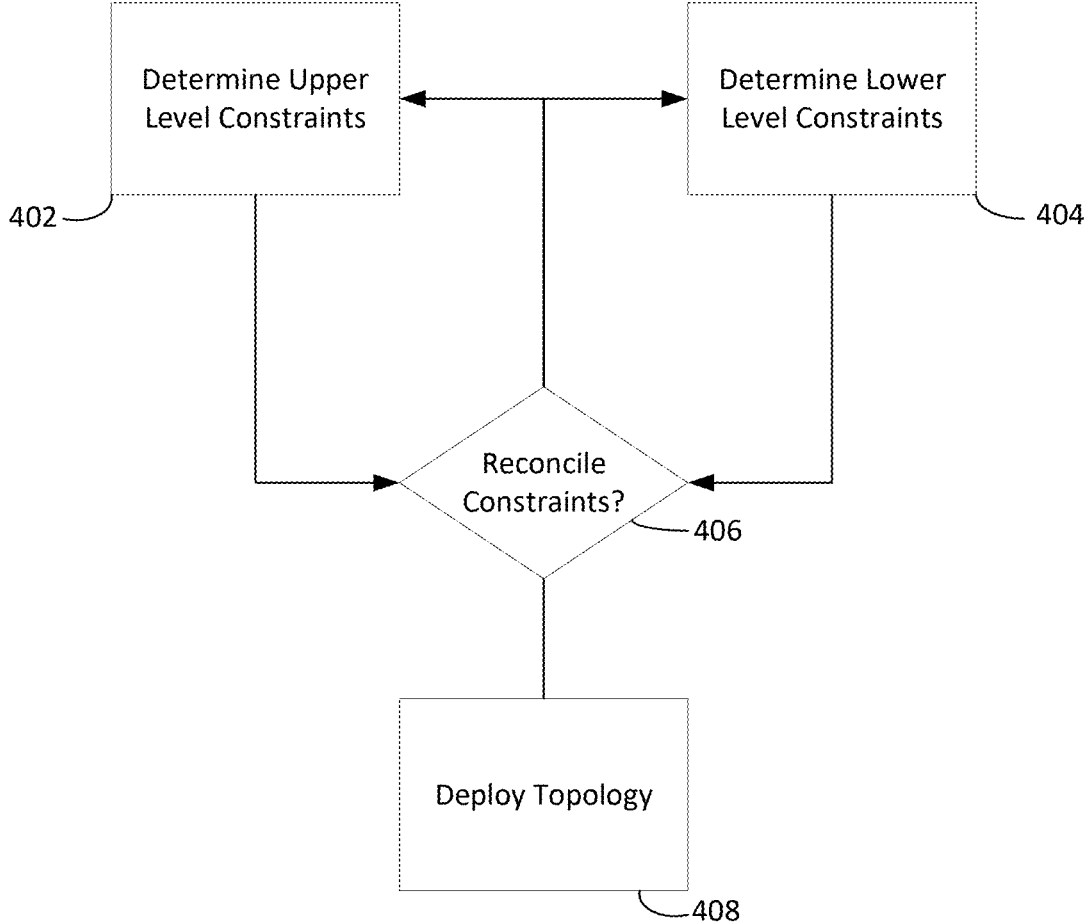
FIG. 4 illustrates a process for determining and reconciling various constraints to deploy and/or determine a cycle-free topology for use on any network topology according to an example.

FIG. 4 illustrates a process 400 for determining and reconciling various constraints to deploy and/or determine a cycle-free topology for use on any network topology. The process 400 may be one example of the process 300, and is—at any rate—wholly compatible with the process 300.

At act 402, the controller determines one or more upper level constraints. The upper level constraints may be requirements for various features of the network and/or topology. It should be appreciated by those of skill in the art that a single level constraint system (e.g., one with just upper or lower level constraints) cannot directly solve the issues identified herein. This is because the problems with deadlocks and flow circulation identified herein require a bi-level constraint framework to ensure deadlock freedom due to the need to simultaneously maximize both objectives under respective constraints and ensures coupling constraints are satisfied. Thus, the bi-level constraints allow for prevention of deadlocks using a single virtual channel layer (as opposed to multiple of said layers).

For example, the controller may require that aggregate flows passing through links in the network do not exceed the corresponding link's capacity. This constraint may be expressed as:

$$Mx \leq C \tag{1}$$

where M is a matrix or vector of links between nodes in the topology, x is a vector or matrix of maximum concurrent flow rates corresponding to the elements of M, and C is a vector or matrix of the capacity of the links. In some examples, the elements of C may all be identical (e.g., all "1") for a homogeneous network. In some examples, the elements of C may be different, e.g., for a heterogeneous network. The elements of M may correspond to specific paths rather than specific links (e.g., the shortest paths between respective origin and destination nodes in the network). Thus, the elements of M need not be limited to merely connections between adjacent nodes.

In some examples, the controller may require that the flow rate along the paths (e.g., the paths of M) is such that paths all have a common demand ratio. This constraint may be expressed as:

$$Qx = dD \tag{2}$$

where Q is a flow-to-path incidence matrix, x is the vector of maximum concurrent flow rates corresponding to the elements of M, d is a scalar expressing the common demand ratio, and D is a demand matrix. Typically, all elements of D are identical (e.g., all "1s"), however, the elements of D may be different (e.g., heterogeneous).

In some examples, the controller may require that the maximum circulation flow in a channel dependency graph of the topology (e.g., on the network) is exactly equal to zero. In some examples, the controller must require that the maximum circulation flow in the channel dependency graph of the topology is exactly equal to zero. If this condition is met, then this condition is sufficient to ensure no cycles occur in the directed graph of the topology, and thus that the routing and/or scheduling indicated by the directed graph may be deployed to the topology. This constraint may be expressed as:

$$\sum f_{u,v} = 0 \tag{3}$$

where $f_{u,v}$ is the amount of fictitious flow along each link in the channel dependency graph and u and v indicate the respective source and destination nodes corresponding to a given path. This constraint (reflected in equation (3)) depends on the output of the lower level constraints determined in act 404.

At act 404, the controller determines the lower level constraints. The lower level constraints may be requirements for various features of the topology and/or network.

For example, the controller may determine that flow conservation laws are observed. In some examples, there may be no external demand for fictitious flows at source or destination nodes in the channel dependency graph, and thus this constraint may require that the amount of fictitious flows along each link and/or path equal zero. In some examples, this constraint may be expressed as:

$$M_{cdg} f = 0 \quad (4)$$

where $M_{cdg}$ is the link-to-path incidence matrix of the channel dependency graph, and f is the amount of fictitious flow along each link in the channel dependency graph (and may be a vector or matrix).

In some examples, the controller may require that fictitious flows not exceed the link capacities induced by the maximum concurrent flow rates. The controller may attempt to maximize the bandwidth and/or size of one or more fictitious flows. This constraint may be expressed as:

$$f_{u,v} \leq \sum x_p \quad (5)$$

where $f_{u,v}$ is the amount of fictitious flow along each link in the channel dependency graph, and $x_p$ is the amount of flow for a respective path, p. In some examples, $x_p$ may be a tentative value and may be subject to change. That is, the precise value of $x_p$ may be refined as the bi-level constraints cause the system to converge to a set of values. Those of skill in the art will appreciate that a single level constraint framework may or will determine that $f_{u,v}$ equals to zero even if the channel dependency graph contains cycles, and thus would not prevent deadlock.

Note that, in the framework described herein, $f_{u,v}$ may remain zero (and in some examples will remain zero) even if $x_p$ is non-zero due to the conservation constraint, e.g., equation (4).

The controller may, in light of equations (4) and (5) and the aforementioned constraints corresponding to those equations, attempt to maximize the amount of fictitious flow in the system. For example, the controller may attempt to perform the expression:

$$MAX \sum f_{u,v} \quad (6)$$

That is, the controller may attempt to maximize the values of $f_{u,v}$ that are to be used in the upper level constraints of act 402. Thus, act 402 may depend on the constraints and/or performance of the controller with respect to act 404 to implement and/or adhere to the constrain expressed by equation (3) of act 402.

The process 400 may then continue to act 406.

At act 406, the controller may determine whether all of the constraints have been met, and whether any adjustment to the scheduling, routing, directed graph, channel dependency graph, and so forth, are necessary. If the controller determines that adjustments are necessary to reconcile the constraints, the process 400 may return to acts 402 and/or 404. If the controller determines that no reconciliation is necessary, the process 400 may continue to act 408. In some examples, the controller determines whether to proceed to act 408 or return to acts 402 and/or 404 based on whether the routing and/or scheduling may result in a deadlock on the topology. If a deadlock would occur, the process 400 may return to acts 402 and/or 404. If a deadlock would not occur, the process 400 may proceed to act 408.

At act 408, the controller may deploy the scheduling and routing to the topology. Deploying the scheduling and/or routing to the topology may ensure that deadlocks will not occur on the topology and may ensure the efficient operation of collective operations.

Figure 5:
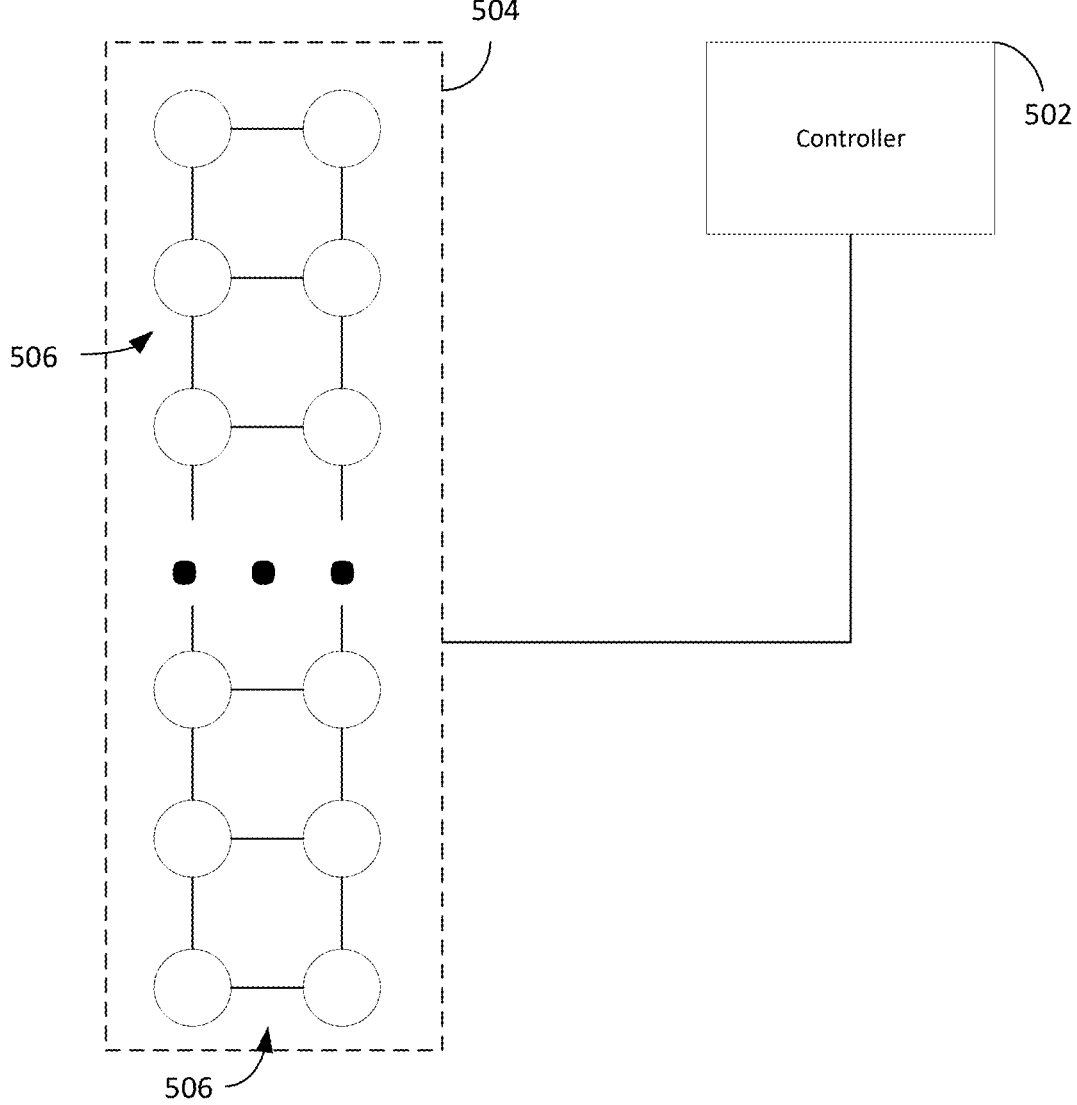
FIG. 5 illustrates a distributed system according to an example.

FIG. 5 illustrates a system 500 that can implement the processes, techniques, and methods disclosed herein. The system 500 include at least one controller 502 ("controller 502"), and a network 504, the network 504 including a plurality of interconnected nodes 506.

The controller 502 is coupled to the network 504. The plurality of interconnected nodes 506 may be coupled to each other in various ways. The controller 502 is configured to have an outside frame-of-reference of the network 504. That is, the controller 502 may determine, observe, and/or know the topology of the network 504. The controller 502 may provide instructions to the network to implement routing, scheduling, and other networking operations. The controller 502 may determine constraints to apply to the network 504, ensure those constraints are met, and thereby ensure the network 504 is deadlock free. The controller 502 may perform any process, method, technique, and so forth discussed herein, and may control the network 504 to operate according to those processes, methods, techniques, and so forth.

The controller 502 may include memory, storage, sensors (e.g., for observing the network 504), input and output ports, a user interface, and so forth. The controller 502 may include receivers, transmitters, transceivers, and so forth. The controller 502 may be unitary or distributed (e.g., the controller 502 may be a single computer, a collective of processing devices, a cloud infrastructure, and so forth).

Hop-to-hop topologies, like those illustrated in FIG. 2A, are tractable using the techniques disclosed herein, but may be relatively slow. Source-routed topologies, like those illustrated in FIG. 2B, may be easier to handle at small sizes, but because the number of possible routes in a source-routed topology increases exponentially as the size of the source-routed network increases, the source-routed topologies may become intractable (at least when treated as a whole unit) when the source-routed topology grows too large.

In some examples disclosed herein, networks may be routed such that segments of the network are handled as source-routed networks (provided the capability is available in the switches on the network), and individual segments are linked together in a hop-to-hop manner, thus hybridizing the network approaches described in FIGS. 2A and 2B. This hybridization may make it tractable to scale the methods and techniques disclosed herein to networks of arbitrary size.

To execute such an approach, the nodes of the network may be partitioned into subgroups. Each subgroup of nodes may be "solved" using the methods and techniques discussed herein (to prevent deadlocks). Each subgroup may also be associated with one or more timesteps, such that the subgroup has access to the entire network while executing its portion of the collective operations being performed. Then the next subgroup may use one or more later timesteps to execute its collective operations (again, with the resources of the entire network available to said subgroup), and so one for each other subgroup until all subgroups have completed all of their operations.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Various controllers, such as the controller 502 may execute various operations discussed above. Using data stored in associated memory and/or storage, the controller 502 also executes one or more instructions stored on one or more non-transitory computer-readable media, which the controller 502 may include and/or be coupled to, that may result in manipulated data. In some examples, the controller 502 may include one or more processors or other types of controllers. In one example, the controller 502 is or includes at least one processor. In another example, the controller 502 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A method of preventing deadlock in a network, the method comprising:
   determining a first bandwidth of one or more first links for one or more nodes in the network;
   determining a second bandwidth of one or more second links for the one or more nodes;
   determining that a demand constraint has been met on the network; and
   determining that a conservation constraint has been met on the network, wherein determining that the conservation constraint has been met comprises, for each link in a channel dependency graph of the network:
   simultaneously determining an amount of fictitious flow along the link and a link capacity associated with the link; and
   determining that the amount of fictitious flow along the link is less than or equal to the link capacity associated with the link.

2. The method of claim 1 wherein determining that the conservation constraint has been met includes:
   restricting a maximum circulation flow along one or more edges of the channel dependency graph of the network such that the maximum circulation flow is zero;
   determining that the maximum circulation flow is zero; and
   determining that the conservation constraint has been met responsive to determining that the maximum circulation flow is zero.

3. The method of claim 1 wherein determining that the demand constraint has been met includes:
   restricting a demand on a connection between a first node and a second node such that one or more flows on the connection are less than or equal to the demand;
   determining that the one or more flows on the connection are less than or equal to the demand; and
   determining that the demand constraint has been met responsive to determining that the one or more flows on the connection are less than or equal to the demand.

4. The method of claim 3 wherein the demand is a proportion of the one or more flows to total flows on the network.

5. The method of claim 1 further comprising determining that a link constraint has been met on the network.

6. The method of claim 5 wherein determining that the link constraint has been met includes:
   determining a capacity of a given link between a first node and a second node;
   restricting flows on the link such that a total amount of the flows does not exceed the capacity;
   determining that the flows do not exceed the capacity; and
   responsive to determining that the flows do not exceed the capacity, determining that the link constraint has been met.

7. The method of claim 6 wherein the capacity is a bandwidth of the link.

8. The method of claim 1 further comprising:
   applying at least one of the demand constraint and the conservation constraint to one or more connections between one or more nodes on the network to limit at least one maximum concurrent flow rate on the network.

9. The method of claim 1 further comprising:
   partitioning one or more nodes of the network into a first partition;
   partitioning one or more nodes of the network into a second partition;

determining, at a first timestep, that the demand constraint or the conservation constraint is met with respect to the first partition; and determining, at a second timestep, that the demand constraint or the conservation constraint is met with respect to the second partition, the first timestep being different from the second timestep.

10. The method of claim 1, wherein determining that the conservation constraint has been met further comprises determining that the amount of the fictitious flow along each link in the channel dependency graph of the network is equal to zero.

11. A non-transitory computer-readable medium containing thereon computer-executable instructions for instructing at least one processor to prevent deadlock on a network, the instructions instructing the at least one processor to:

determine a first bandwidth of one or more first links for one or more nodes in the network;

determine a second bandwidth of one or more second links for the one or more nodes;

determine whether a demand constraint has been met on the network; and determine whether a conservation constraint has been met on the network, wherein the instructions for instructing the at least one processor to determine that the conservation constraint has been met further instruct the at least one processor to, for each link in a channel dependency graph of the network:

simultaneously determine an amount of fictitious flow along the link and a link capacity associated with the link; and determine that the amount of fictitious flow along the link is less than or equal to the link capacity associated with the link.

12. The non-transitory computer-readable medium of claim 11 wherein the instructions further instruct the at least one processor to:

restrict a maximum circulation flow along one or more edges of the channel dependency graph of the network such that the maximum circulation flow is zero;

determine that the maximum circulation flow is zero; and determine that the conservation constraint has been met responsive to determining that the maximum circulation flow is zero.

13. The non-transitory computer-readable medium of claim 11 wherein the instructions further instruct the at least one processor to:

restrict a demand on a connection between a first node and a second node such that one or more flows on the connection are less than or equal to the demand;

determine whether the one or more flows on the connection are less than or equal to the demand; and determine whether the demand constraint has been met responsive to determining that the one or more flows on the connection are less than or equal to the demand.

14. The non-transitory computer-readable medium of claim 11 wherein the instructions further instruct the at least one processor to:

determining whether a link constraint has been met on the network.

15. The non-transitory computer-readable medium of claim 14 wherein the instructions further instruct the at least one processor to:

determine a capacity of a given link between a first node and a second node;

restrict flows on the link such that a total amount of the flows does not exceed the capacity;

determine whether the flows do not exceed the capacity; and responsive to determining that the flows do not exceed the capacity, determine whether the link constraint has been met.

16. The non-transitory computer-readable medium of claim 11 wherein the instructions further instruct the at least one processor to:

partition one or more nodes of the network into a first partition;

partition one or more nodes of the network into a second partition;

determine, at a first timestep, whether the demand constraint or the conservation constraint is met with respect to the first partition; and determine, at a second timestep, whether the demand constraint or the conservation constraint is met with respect to the second partition, the first timestep being different from the second timestep.

17. A system for preventing deadlocks on a network, the system comprising:

a first cluster including one or more nodes having one or more intracluster connections;

a second cluster having at least one intercluster connection to the first cluster, the second cluster including one or more nodes having one or more intracluster connections; and a controller coupled to the network and configured to control the network by:

determining a first bandwidth of one or more first links for one or more nodes in the network;

determining a second bandwidth of one or more second links for the one or more nodes;

determining that a demand constraint has been met on the network; and determining that a conservation constraint has been met on the network, wherein determining that the conservation constraint has been met comprises, for each link in a channel dependency graph of the network:

simultaneously determining an amount of fictitious flow along the link and a link capacity associated with the link; and determining that the amount of fictitious flow along the link is less than or equal to the link capacity associated with the link.

18. The system of claim 17 wherein the controller is further configured to control the network by:

restricting a maximum circulation flow along one or more edges of the channel dependency graph of the network such that the maximum circulation flow is zero;

determining that the maximum circulation flow is zero; and determining that the conservation constraint has been met responsive to determining that the maximum circulation flow is zero.

19. The system of claim 17 wherein the controller is further configured to control the network by:

restricting a demand on a connection between a first node and a second node such that one or more flows on the connection are less than or equal to the demand;

determining that the one or more flows on the connection are less than or equal to the demand; and determining that the demand constraint has been met responsive to determining that the one or more flows on the connection are less than or equal to the demand.

20. The system of claim 17 wherein the controller is further configured to control the network by:

determining a capacity of a given link between a first node and a second node;

restricting flows on the link such that a total amount of the flows does not exceed the capacity;

determining that the flows do not exceed the capacity; and responsive to determining that the flows do not exceed the capacity, determining that a link constraint has been met.

* * * * *